United States Patent [19]
Wolgamood

[11] Patent Number: 5,993,135
[45] Date of Patent: Nov. 30, 1999

[54] RETRACTABLE LOADING RAMP FOR A CARGO VEHICLE

[76] Inventor: Steve Wolgamood, 30624 Marydon La., Elkhart, Ind. 46517

[21] Appl. No.: 08/878,009

[22] Filed: Jun. 18, 1997

[51] Int. Cl.$^6$ ...................................................... B60P 1/43
[52] U.S. Cl. ............................................. 414/537; 296/61
[58] Field of Search ........................... 414/537, 538; 14/69.5, 71.1; 296/61, 62

[56] References Cited

U.S. PATENT DOCUMENTS

| | | | |
|---|---|---|---|
| 1,006,025 | 10/1911 | Taylor | 414/537 X |
| 3,138,272 | 6/1964 | Flowers | 414/537 |
| 3,288,522 | 11/1966 | Norton | 296/61 |
| 3,756,440 | 9/1973 | Raap et al. | 414/537 |
| 3,795,333 | 3/1974 | Tebber | 414/537 |
| 4,003,483 | 1/1977 | Fulton | 414/537 |
| 4,088,235 | 5/1978 | Thacker | 14/71.1 X |
| 4,274,172 | 6/1981 | Franklin | 14/69.5 |
| 4,701,087 | 10/1987 | Cain et al. | 296/61 X |
| 4,966,516 | 10/1990 | Vartanian | 14/71.1 X |
| 5,211,437 | 5/1993 | Gerulf | 414/537 X |
| 5,380,145 | 1/1995 | Czaplewski | 414/537 |
| 5,535,470 | 7/1996 | Baranowski | 414/537 X |
| 5,538,307 | 7/1996 | Otis | 414/537 X |
| 5,676,515 | 10/1997 | Haustein | 414/537 |
| 5,769,593 | 6/1998 | Buffaloe | 414/537 |

*Primary Examiner*—David A. Bucci
*Attorney, Agent, or Firm*—Baker & Daniels

[57] ABSTRACT

A retractable loading ramp for attachment to a cargo vehicle. The retractable loading ramp of the present invention incorporates an articulated hinge consisting of a pivot plate that pivotally connects the ramp structure to the vehicle. The hinge device also permits the loading ramp to slide back and forth along a horizontal path so that one or more ramps may be placed in the desired position. The articulated hinge effectively lengthens the length of the loading ramp, yet permits the ramp to be manipulated to a stored position without contacting the roof or bulkhead of the cargo vehicle. The pivoting hinge is mounted to a transverse rod which allows the ramp to be slideable between the side edges of the cargo vehicle.

18 Claims, 12 Drawing Sheets

RETRACTABLE LOADING RAMP FOR A CARGO VEHICLE

The present invention relates to a retractable loading ramp for use on cargo vehicles such as towable cargo trailers.

BACKGROUND AND SUMMARY OF THE INVENTION

Cargo trailers and light utility trailers are generally well known in the art. Such trailers have many recreational and commercial applications and are quite useful for hauling motorcycles, snowmobiles, small tractors, construction equipment and other light cargo. Although some light trailers are open, for a variety of reasons many consumers prefer cargo trailers that are fully enclosed. The floor of most commercially available cargo trailers is typically spaced 18 inches or more above the ground, and thus the cargo is typically rolled, carted, driven or otherwise carried onto the trailer using a loading ramp.

For many consumers, the loading ramp presents somewhat of a problem. Although some trailers come equipped with their own loading ramps, such ramps are typically very cumbersome, difficult to deploy, and are very inconvenient to store. For example, on some enclosed trailers the ramp is integrated into the cargo door. The cargo door is hinged at the bottom, and when folded down the inner surface of the door forms a ramp. These fold down doors are typically very heavy and unwieldy, and therefore must be installed by the manufacturer. On other trailers, the loading ramp is carried by a rack or sling under the trailer, and the user slides the ramp out of the rack and attaches the ramp to the end of the trailer. These ramps, like the integrated door ramps, are unwieldy, difficult to deploy, and are exposed to mud, dirt and road grime and are thus prone to rust and corrosion. Accordingly, there exists a need for an improved loading ramp for cargo and utility trailers that is easy to install and easy to operate.

The improved retractable loading ramp of the present invention solves each of the problems referred to above. The present invention provides a hinged loading ramp that is attached to a pivot plate, which in turn is pivotally attached to the frame of the cargo trailer. Further, the entire ramp assembly is mounted on a slide or track assembly, which allows the ramp to slide back and forth along a line generally parallel to the rear or loading end of the trailer. Thus, the loading ramp is pivotable relative to both the pivot plate and the vehicle, and is slidable relative to the vehicle. Consequently, when the ramp is not being used the ramp is stored in a generally upright position secured against the sides of the vehicle. When the ramp is deployed, the user slides the ramp away from the side of the vehicle and pivots the ramp to the ground. The ramp includes a pivot plate, which permits the ramp to pivot over the vehicle bumper, and consequently the present invention can be easily retrofitted to existing vehicles without altering the rear or loading edge of the vehicle. The ramp is easily stowed in a secure, upright position, and includes one or more handles to facilitate fast and easy deployment.

Accordingly, it is an object of this invention to provide a pivoting loading ramp for use on cargo trailers and other cargo vehicles.

It is another object of this invention to provide an improved loading ramp for cargo vehicles that can be placed in a variety of positions.

A still further object of this invention is to provide a loading ramp that can be stored inside the cargo vehicle without interfering with cargo space.

Other objects of the invention will become readily apparent to those skilled in the art upon a reading of the following description.

DETAILED DESCRIPTION OF THE INVENTION

The embodiments herein described are not intended to be exhaustive or to limit the invention to the precise form disclosed. They are chosen and described to explain the principles of the invention and its application and practical use to best enable others skilled in the art to follow its teachings.

Figure 1:
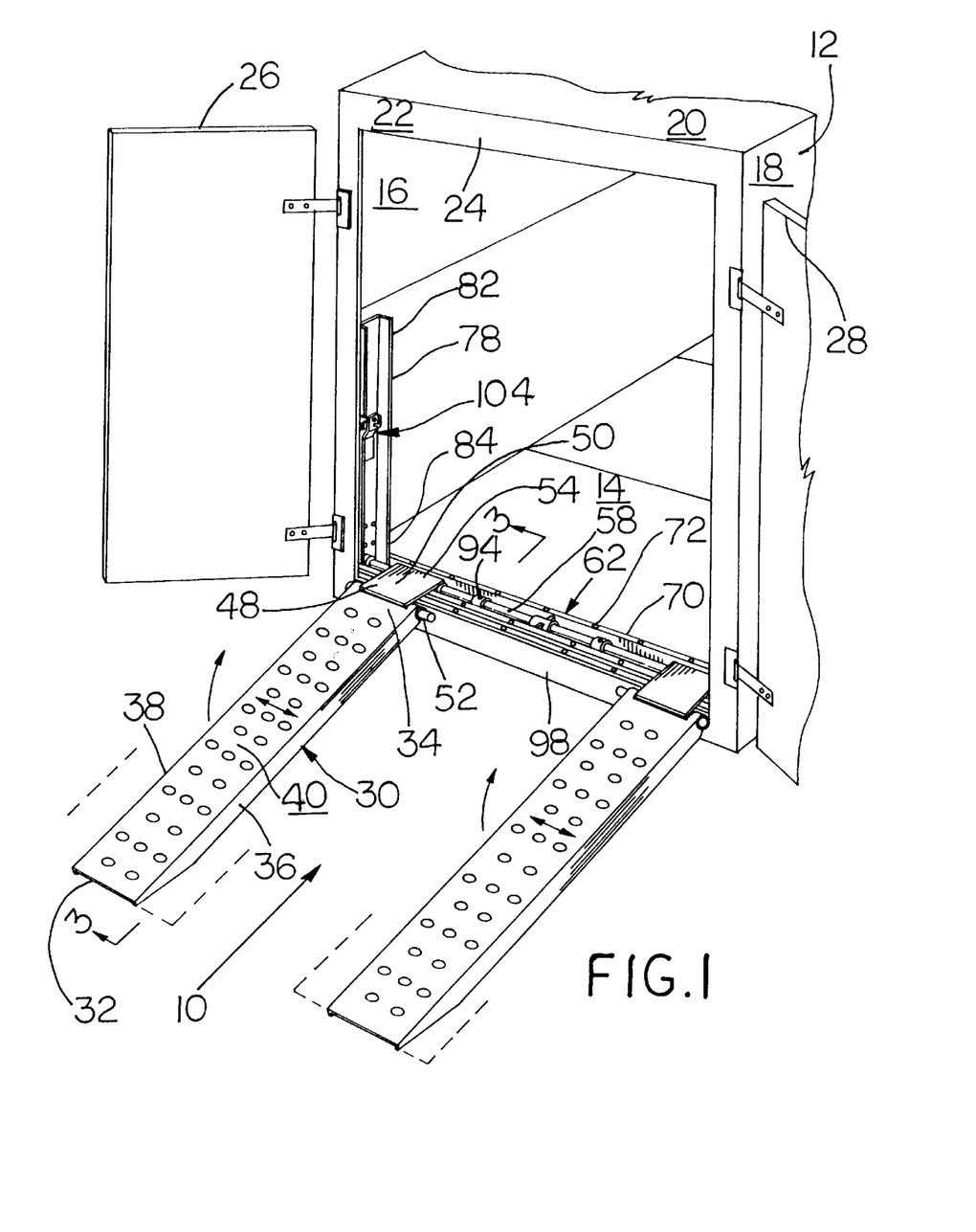
FIG. 1 is a perspective view of a cargo vehicle having a retractable loading ramp incorporating the features of the present invention.

Referring now to the drawings, a retractable loading ramp device incorporating the features of the present invention is generally indicated by the reference numeral 10 and is shown installed on a typical cargo vehicle 12. The vehicle 12 typically includes a floor 14, a pair of side walls 16, 18, a roof 20, an end wall 22 having a bulkhead 24, a forward wall (not shown) and a pair of doors 26, 28. Device 10 includes a pair of ramps 30, each of which includes a pair of ends 32, 34, and a pair of side edges 36, 38 joined by an interconnecting load bearing surface 40. Edges 36, 38 taper towards end 32, to permit end 32 to rest flush on the ground or support surface 42. As shown to advantage in FIGS. 2 and 3, end 34 includes a pair of cylindrical sleeves 44, which align with a corresponding cylindrical sleeve 46 in end 48 of a link member or pivot plate 50. End 34 of ramp 30 is pivotally connected to end 48 of link plate 50 by a tubular shaft 52 inserted through sleeves 44, 46. Tubular shaft 52 is secured within sleeves 44, 46 by a cotter pin or similar means (not shown).

Figure 2:
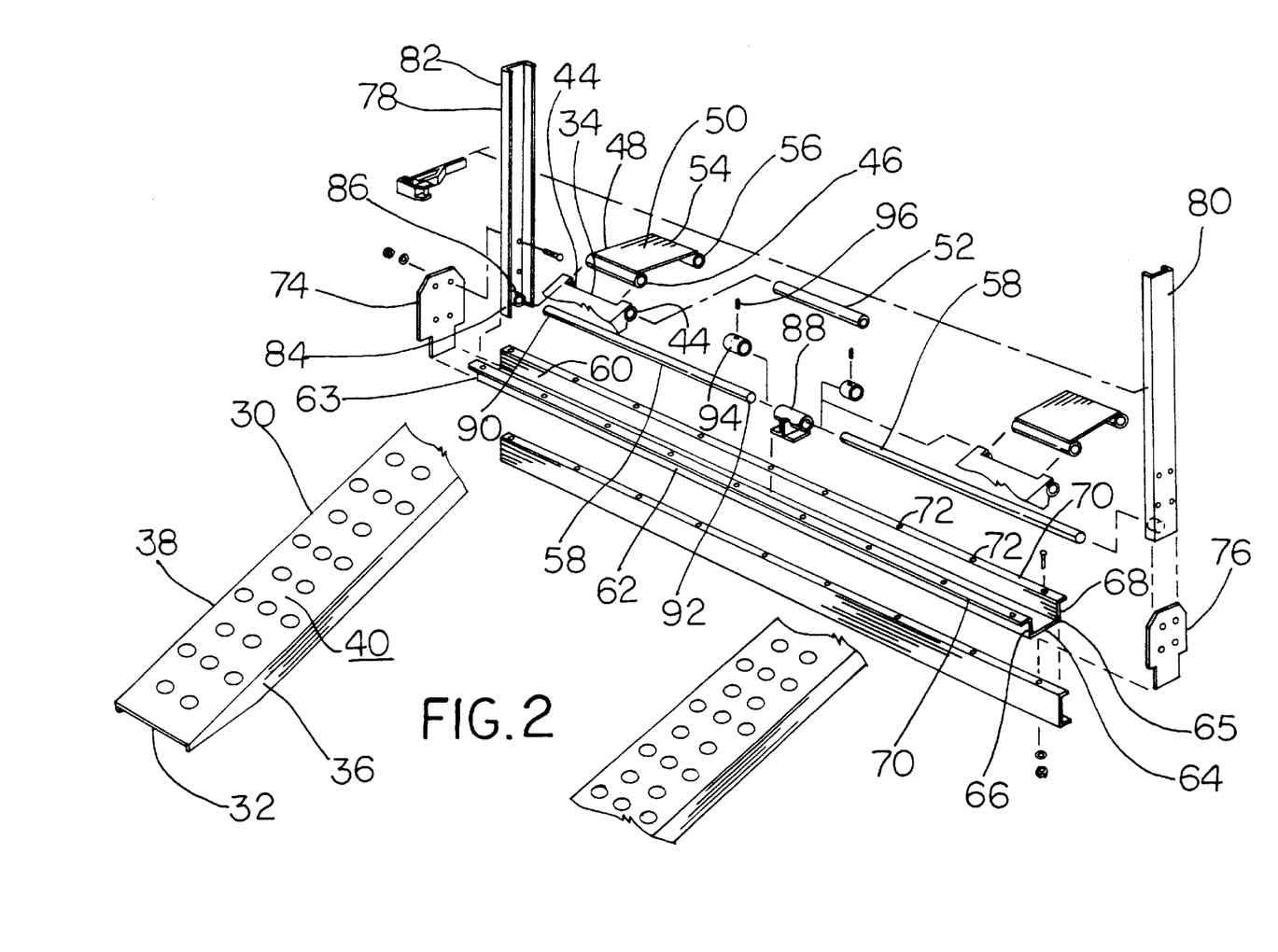
FIG. 2 is a fragmentary exploded view in perspective of the retractable loading ramp shown in FIG. 1.

As shown in FIG. 2, end 54 of link plate 50 includes sleeve 56 which is pivotally connected to a transverse rod 58. Transverse rod 58 is in turn mounted within a recess 60 defined in channel 62. Channel 62 includes a pair of ends 63, 65, a generally horizontal web or base 64 and a pair of upwardly extending flanges 66, 68, each of which includes an outwardly turned mounting lip 70 having a plurality of mounting holes 72 therein. Flanges 66, 68 cooperate to define the recess 60. Each of ends 63, 65 have attached thereto an end plate 74, 76, respectively, which are welded, bolted, or otherwise secured to the ends 63, 65 of channel 62. Each of end plates 74, 76 has attached thereto a riser 78, 80, respectively, which are bolted or otherwise secured to their corresponding end plates. Each of risers 78, 80 includes an upper end 82, a lower end 84, and a cylindrical mounting sleeve 86 adjacent its the lower end 84.

A cylindrical inboard support sleeve 88 is mounted within recess 60 of channel 62 adjacent the middle portion of channel 62 such as by mounting bolts or welding (not shown). Rod 58 is mounted such that its outboard end 90 is mounted in mounting sleeve 86, while its inboard end 92 is mounted in inboard support sleeve 88. Although only the rod 58 to the left of FIG. 2 is described in detail, it will be understood that the rod 58 to the right of FIG. 2 is of similar construction and is the mirror image of the construction shown to the left. Alternatively, it will be understood that the device 10 could employ a single rod spanning the distance between risers 78, 80. As stated above, sleeve 56 of link plate 50 is pivotally mounted to rod 58, which permits link plate 50 to pivot about rod 58 and which further permits link plate 50 to slide back and forth along rod 58 between outboard end 90 and inboard end 92. An annular collar or stop member 94 fits over rod 58, and is secured in place by a set screw 96, in order to limit the range of motion of link plate 50 along rod 68.

Figure 3:
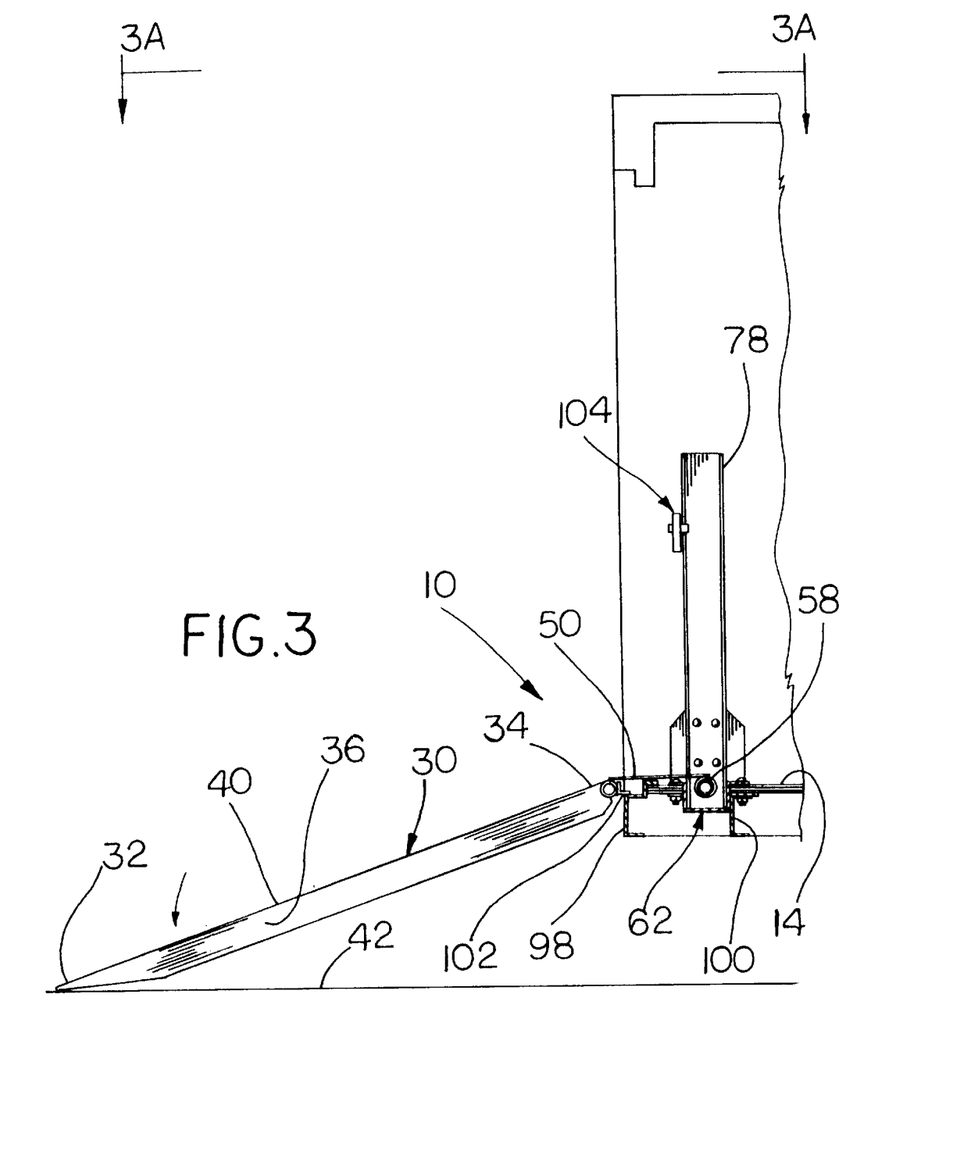
FIG. 3 is a fragmentary view in section taken along lines 3—3 of FIG. 1 showing the loading ramp in the load position.
Figure 3A:
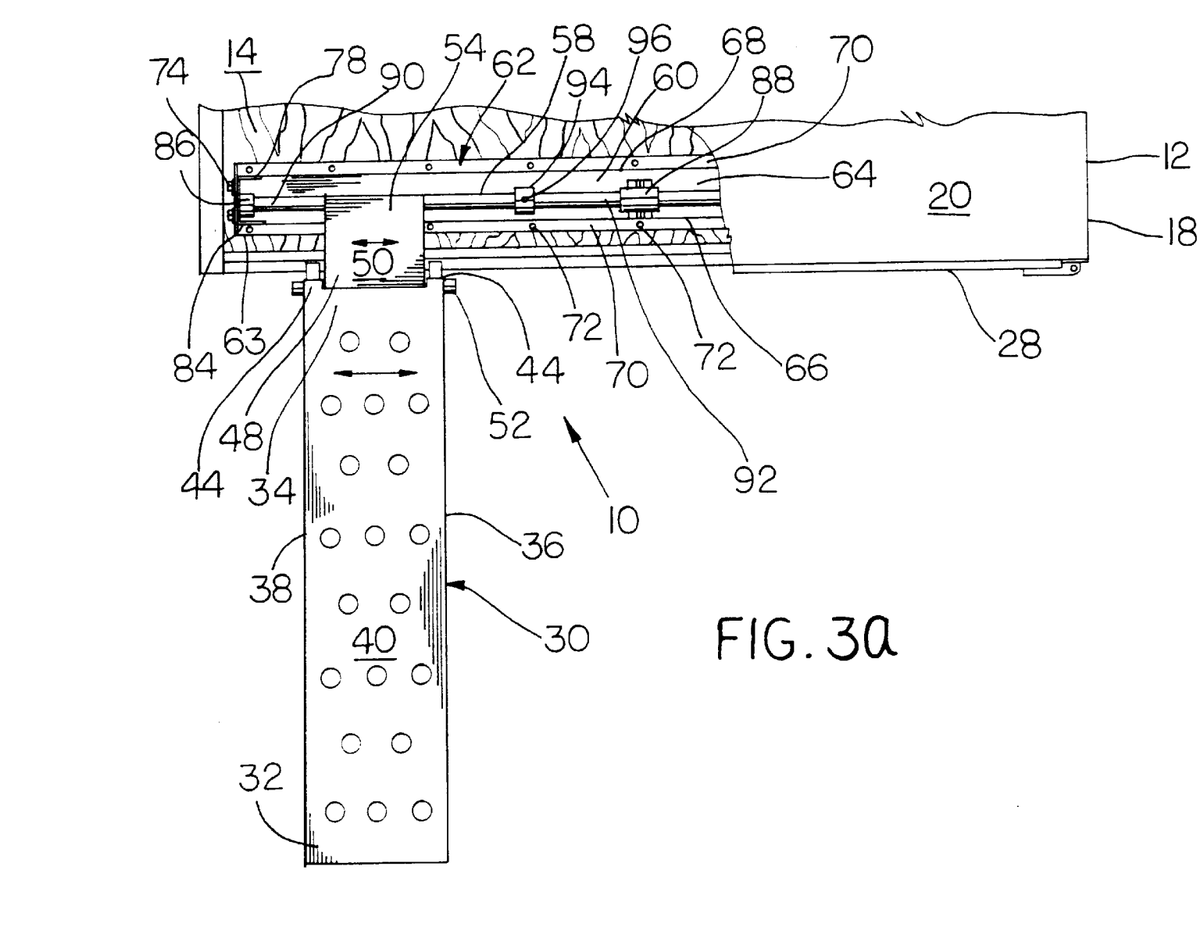
FIG. 3a is a fragmentary top plan view taken along lines 3a—3a of FIG. 3 of the device shown in FIGS. 1 and 2 illustrating the manner by which the loading ramp is slidable between the vehicle side edge and the inward or middle portion of the vehicle.

Referring now to FIG. 3, vehicle 12 includes an end member or bumper 98 and a transverse frame rail 100. Device 10 is mounted to floor 14 of trailer 12 by a plurality of mounting bolts secured through holes 72 of channel 62. An angled stop member 102 is mounted to ramp 30 adjacent end 34, and rests on bumper 98 when link plate 50 is in the load position shown in FIG. 3. Accordingly, any load on the end 34 of ramp 30 or the pivot plate 50 is carried by both the bumper 98 and the rod 58.

Figure 4:
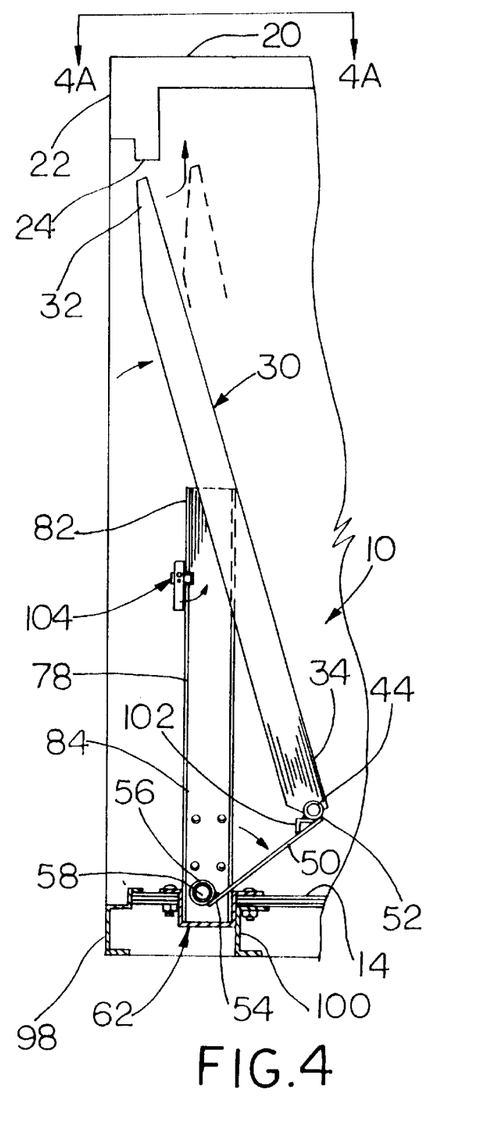
FIG. 4 is a fragmentary view in section similar to that shown in FIG. 3 but shown with the ramp pivoted towards the stored position; the ramp is shown pivoted relative to the link member, the link member being shown pivoted relative to the floor mounted rod to enable the ramp end to clear the vehicle bulkhead.
Figure 4A:
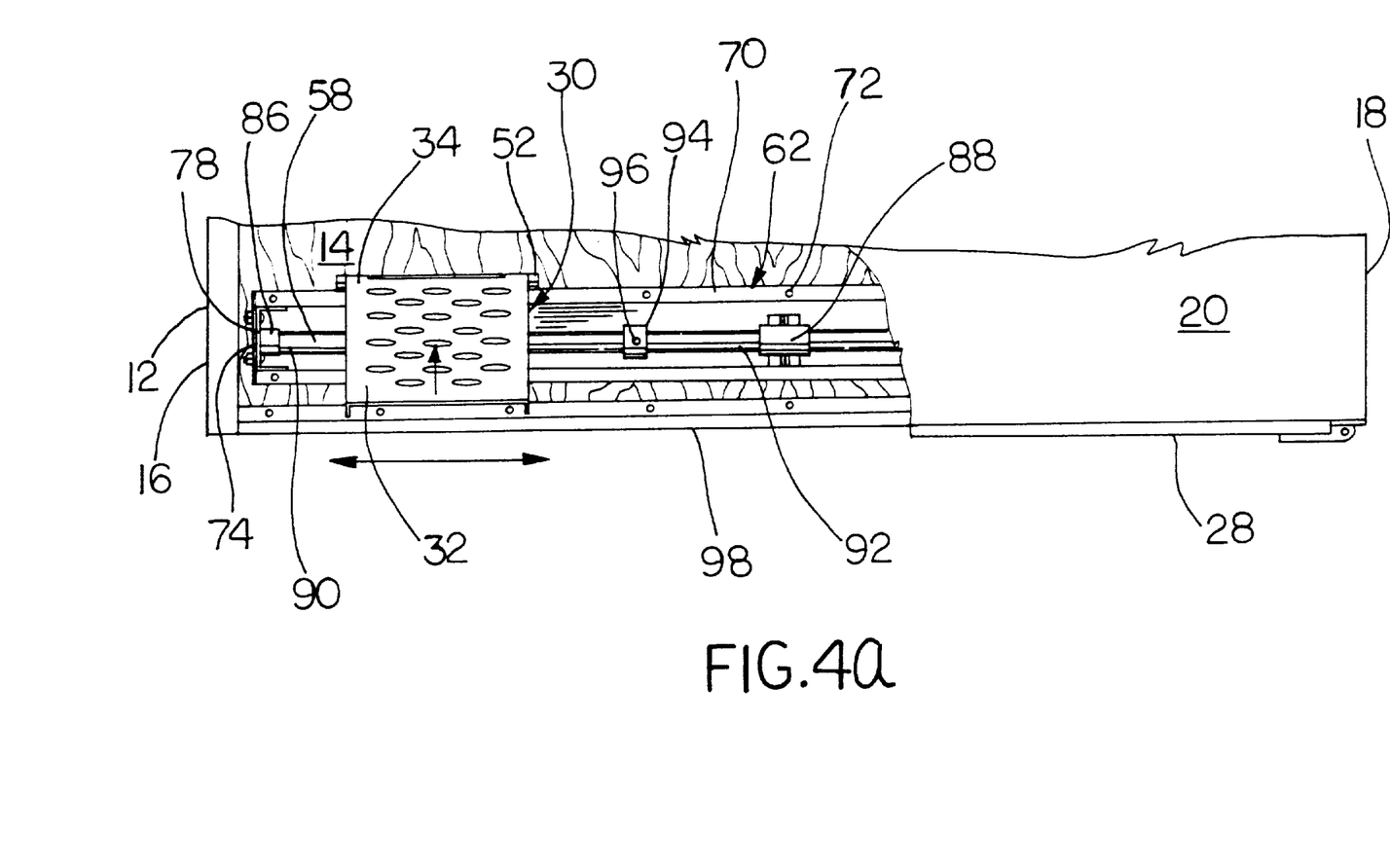
FIG. 4a is a fragmentary top plan view taken along lines 4a—4a of FIG. 4 illustrating the loading ramp in a position to clear the vehicle bulkhead.
Figure 10:
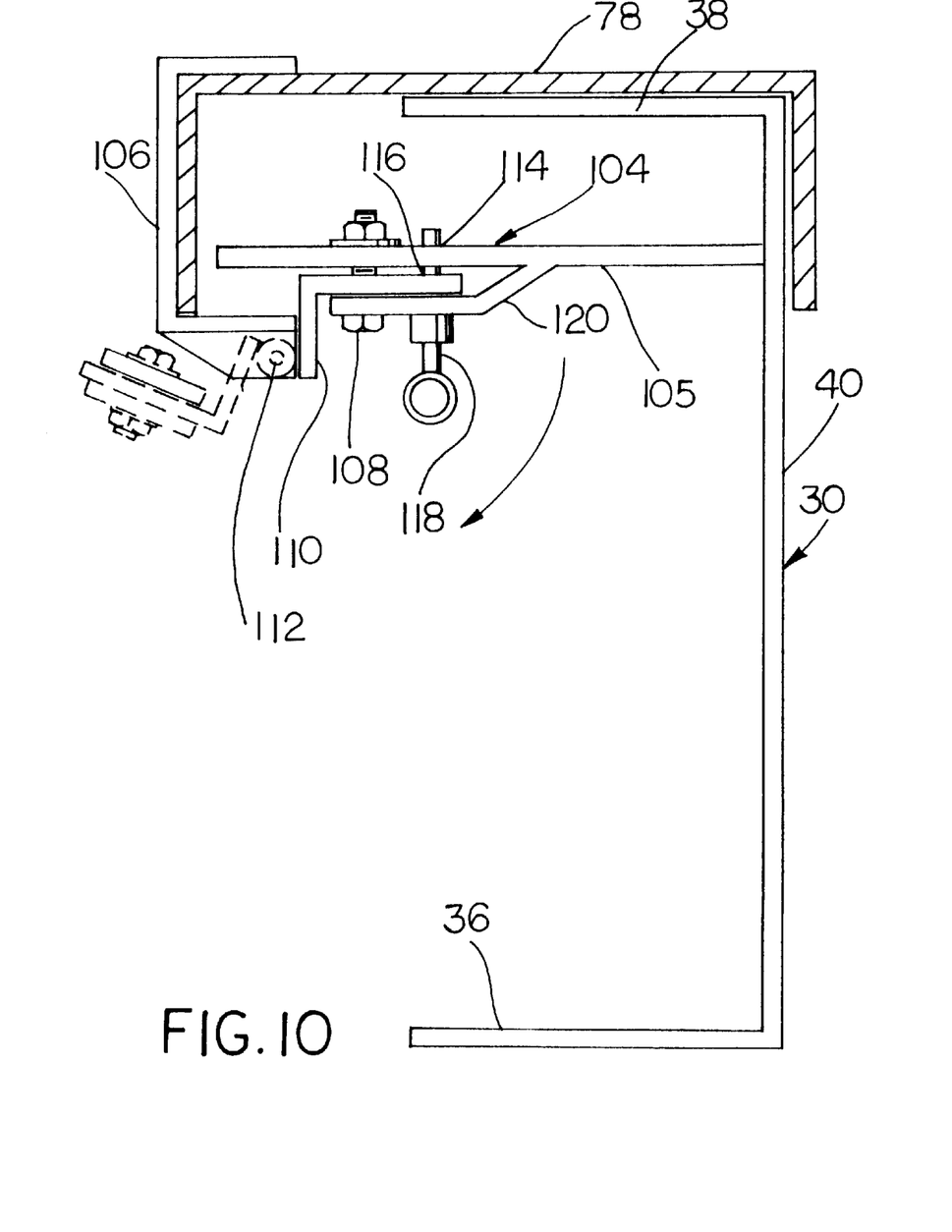
FIG. 10 is a fragmentary top plan view taken along lines 10—10 of FIG. 5 showing the locking mechanism for securing the ramp in the stored position.

Referring now to FIG. 10, riser 78 includes a ramp locking bar 104 for locking the ramp 30 in the stored position adjacent the riser 78. It will be understood that the riser 80 is the mirror image of that described for riser 78, although only riser 78 will be described. The locking bar 104 includes a mounting bracket 106 which is welded, bolted or otherwise secured to its corresponding riser 78. Locking bar 104 includes an arm or brace 105 which pivots about horizontal pivot 108 between the horizontal position shown in solid lines in FIG. 10, and the vertical retracted position shown in FIGS. 1 or 4. When in the horizontal position shown in FIG. 10, brace 105 of locking bar 104 abuts ramp 30, which has been placed in the stored position so that the side edge 38 and support surface 40 is received within the corner of riser 78, so that locking bar 104 secures the ramp 30 in the stored position. Locking bar 104 also includes a pivoting base 110 which is connected to bracket 106 by a vertical pivot 112, which allows the base 110 to pivot to the retracted position shown in dotted lines in FIG. 10 or as shown in solid lines in FIG. 4. Each of brace 105 and base 110 include an aperture 114, 116, respectively, which align when the brace 105 is in the horizontal position of FIG. 10. A retractable retention pin 118, which is preferably spring loaded, is mounted to leg 120 of brace 105 and engages the apertures 114, 116 to maintain the brace 105 in the horizontal position, thus maintaining the ramp 30 in the stored position adjacent riser 78. When the pin 118 is retracted, the brace 105 pivots about pivot 108, and base 110 pivots about pivot 112, which releases ramp 30.

Figure 5:
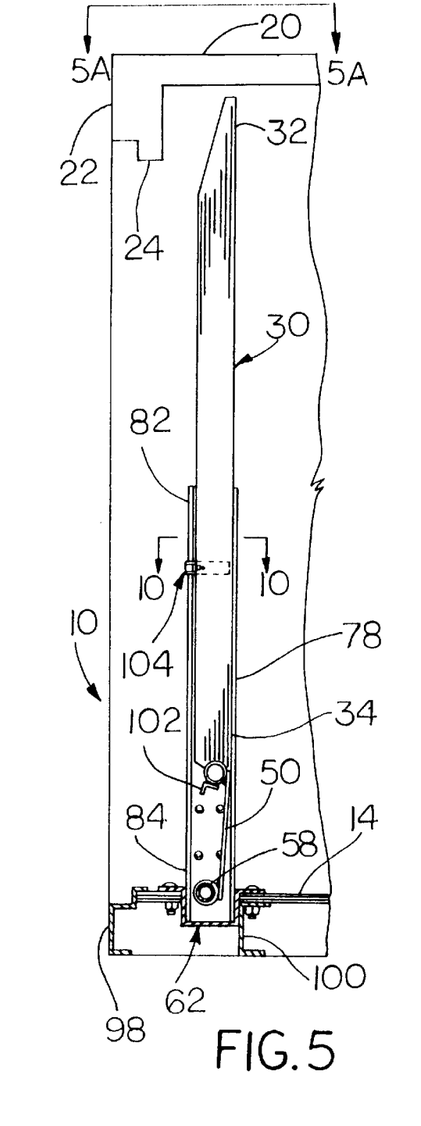
FIG. 5 is a fragmentary view in section similar to that shown in FIG. 4 but shown with the ramp in a stored position secured and locked to the upright channel by a locking mechanism.
Figure 5A:
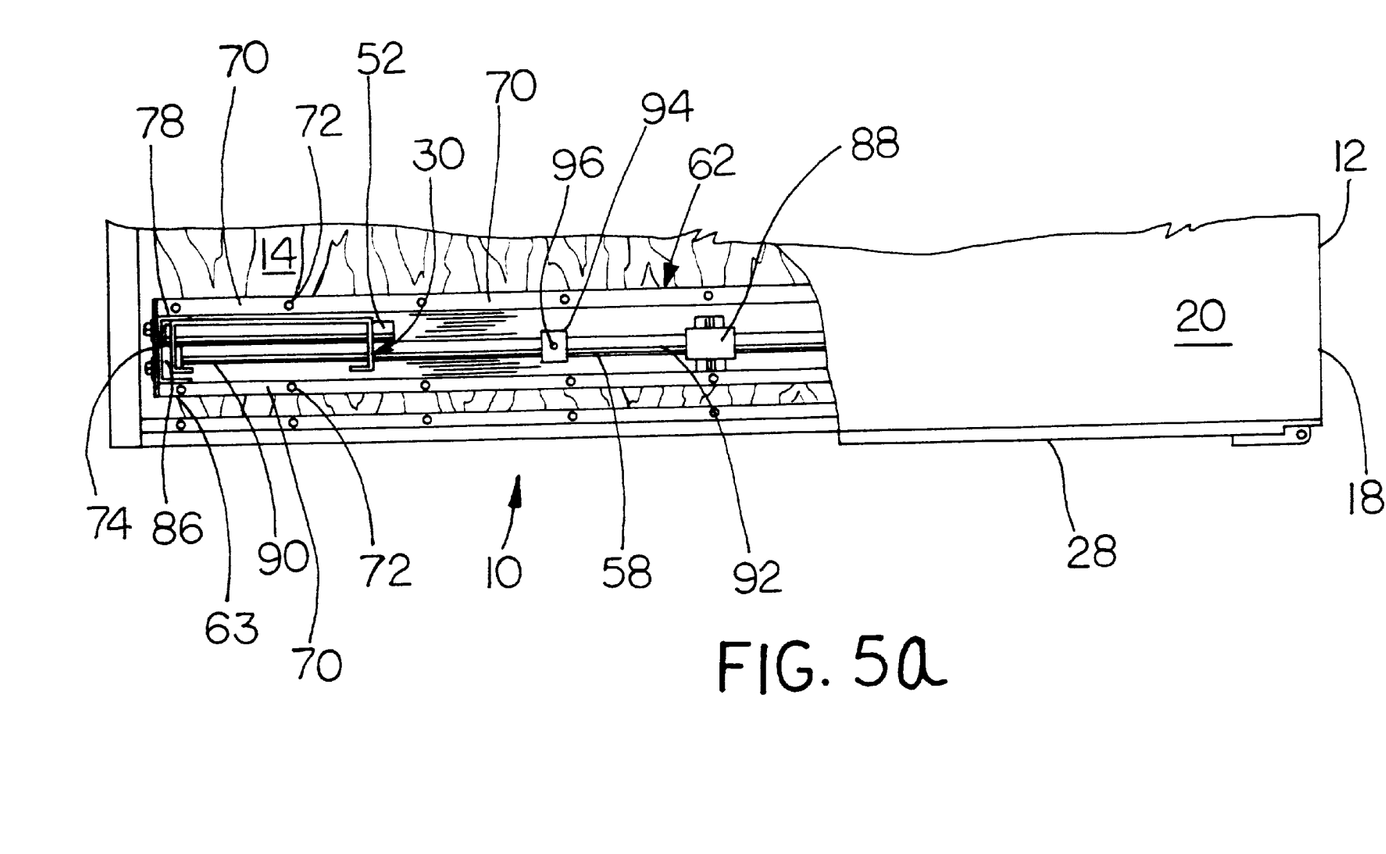
FIG. 5a is a fragmentary top plan view taken along lines 5a—5a of FIG. 5 illustrating the loading ramp in a stored position.

In operation, when the doors 26, 28 of trailer 12 are to be closed, with or without cargo in the interior of the trailer, the ramps 30 are placed in the stored position shown in FIGS. 5, 5a and 10. The ramp 30 is retained in the stored position shown by the locking bar 104 which abuts the underside of surface 40, thereby securing the ramp 30 against either of risers 78. In order to deploy the ramp 30, the user retracts the retention pin 118, and pivots brace 105 of locking bar 104 downwardly, and then pivots base 110 about pivot 112 until the locking bar 104 is disposed in the position shown in dotted lines in FIG. 10. The ramp 30 can then be moved horizontally by sliding pivot plate 50 along rod 58. As shown in 4, when the ramp 30 is disengaged from the riser 78, the ramp drops to an intermediate position with the pivot plate 50 pivoted forward about rod 58, and the stop member 102 abutting the underside of ramp 30. Stop member 102 helps to maintain the ramp 30 in the intermediate position, while the operator manipulates the horizontal position of ramp 30 along rod 58 using the protruding end of tubular shaft 52 as a handle. When in the intermediate position, the end 32 of ramp 30 can be lowered sufficiently to clear the bulkhead 24 on end wall 22 of trailer 12. The pivoting action of pivot plate 50 thus gives the ramp 30 a longer effective length when fully deployed as shown in FIG. 3. The ramp 30 is moved horizontally along rod 58 until the ramp contacts the stop member 94 which would typically be placed along rod 58 at a predetermined location. As such, the distance between ramps 30 can quickly be positioned to match the distance between the wheels of a tractor or lawnmower (not shown).

The operator then pivots the ramp 30 so that the pivot plate 50 pivots rearwardly about rod 58 towards the position shown in FIG. 3. At the same time ramp 30 pivots relative to pivot plate 50 about shaft 52, until the ramp is in the position shown in FIGS. 1 and 3 with end 32 on the ground. The ramp 30 is thus positioned for loading. The process above described is reversed in order to return the ramp 30 to the stored position.

Figure 6:
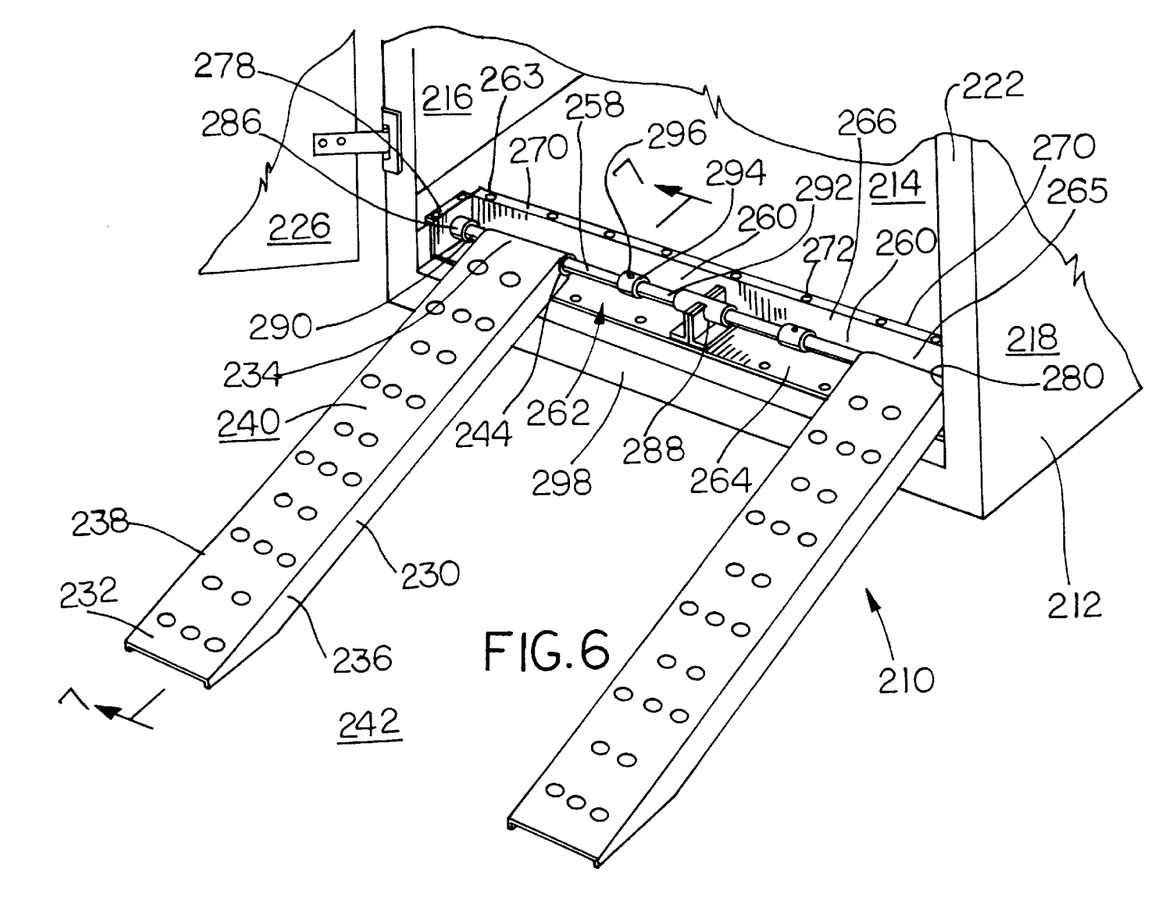
FIG. 6 is a fragmentary view in perspective of a second embodiment of the present invention showing the loading ramps in the load position.
Figure 7:
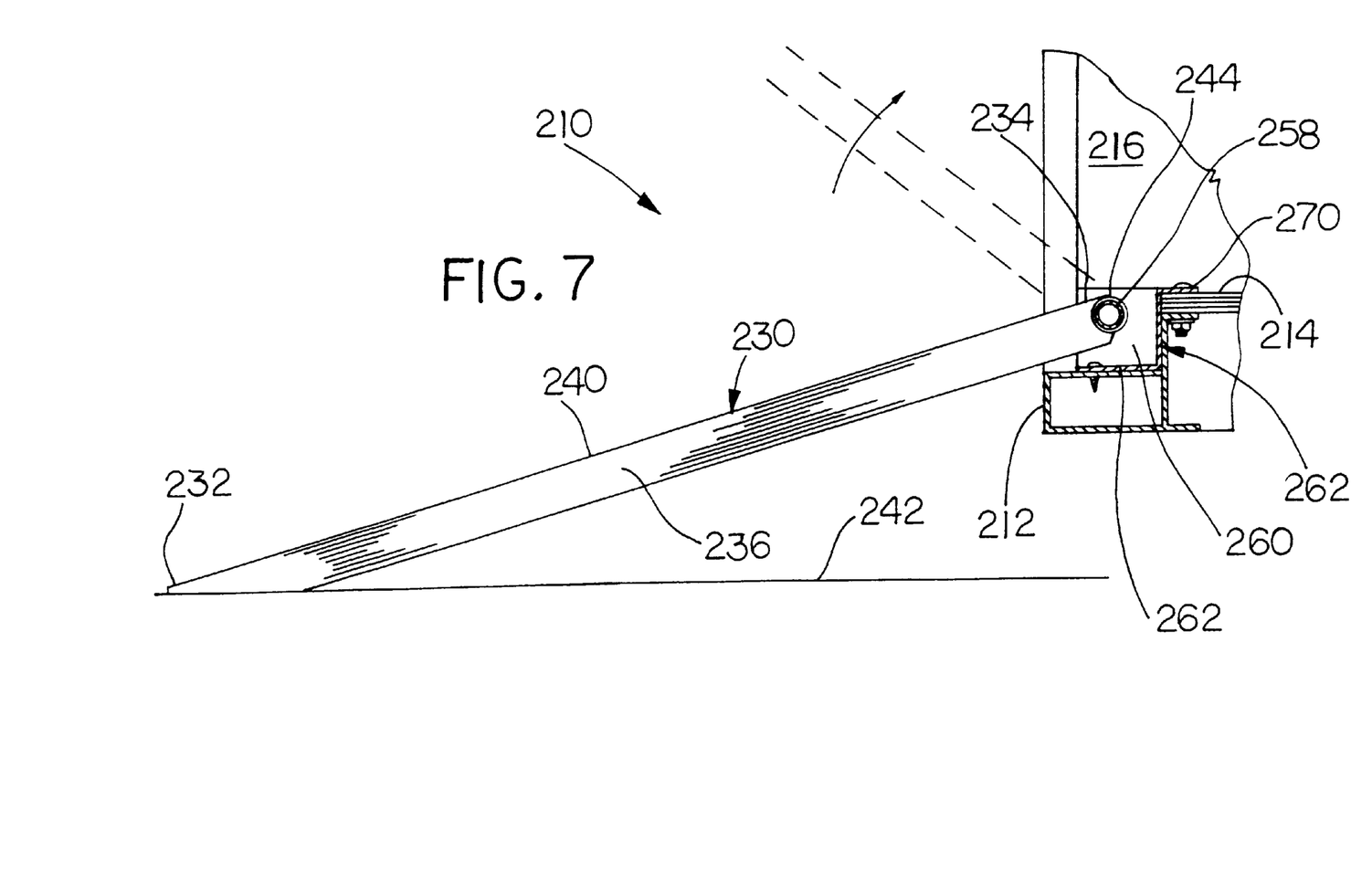
FIG. 7 is a fragmentary view in section taken along lines 7—7 of FIG. 6 illustrating how the ramp pivots from the load position towards the stored position.

Referring now to the embodiment of FIGS. 6 and 7, a retractable loading ramp device 210 is shown installed on a typical cargo vehicle 212. The vehicle 212 typically includes a floor 214, a pair of side walls 216, 218, a roof (not shown), an end wall 222, and one or more doors 226. The embodiment shown illustrates a pair of ramps 230, although the cargo vehicle 212 could include only a single ramp. Only the construction of the ramp shown to the left of FIG. 6 will be described, and it will be understood that the construction of the ramp to the right is the mirror image of that described.

Ramp 230 includes a pair of ends 232, 234, and a pair of side edges 236, 238 joined by an interconnecting load bearing surface 240. Edges 236, 238 taper towards end 232, to permit end 232 to rest flush on the ground or support surface 242. End 234 includes a cylindrical sleeve 244, which is pivotally connected to a transverse rod 258. Transverse rod 258 is in turn mounted within a recess 260 defined in channel 262. Channel 262 includes a pair of ends 263, 265, a generally horizontal web or base 264 and an upwardly extending flange 266 which includes a series of outwardly turned horizontal mounting lips 270. Base 264 and lips 270 include a plurality of mounting holes 272 therein for securing the channel 262 to the floor 214 of cargo vehicle 212. Flanges 266 cooperates with base 264 to define an angled recess 260. Each of ends 263, 265 includes a cylindrical mounting sleeve 286 which receives the outboard end 290 of transverse rod 258. A cylindrical inboard support sleeve 288 is mounted within recess 260 of channel 262 adjacent the middle portion of channel 262 such as by mounting bolts or welding (not shown). Rod 258 is mounted such that its outboard end 290 is mounted in mounting sleeve 286 adjacent end 263, while its inboard end 292 is mounted in inboard support sleeve 288. The rod to the right of FIG. 6 is mounted in a similar manner. Alternatively, it will be understood that a single rod 258 could be used to span the distance between ends 263, 265. Accordingly, ramp 230 pivots about transverse rod 258, and also slides along rod 258, which thus permits ramp 230 to be manipulated between a stored position and a deployed or load position. Each of ends 263, 265 has attached thereto a riser 278, 280, respectively, which is bolted or otherwise secured to its corresponding end. Each of risers 278, 280 includes a cylindrical mounting sleeve 286. The embodiment of FIGS. 6 and 7 is more suitable for applications in which the ramp device is to be installed by the manufacturer of the trailer, and in applications in which the amount of clearance above the ramp is not critical.

Figure 8:
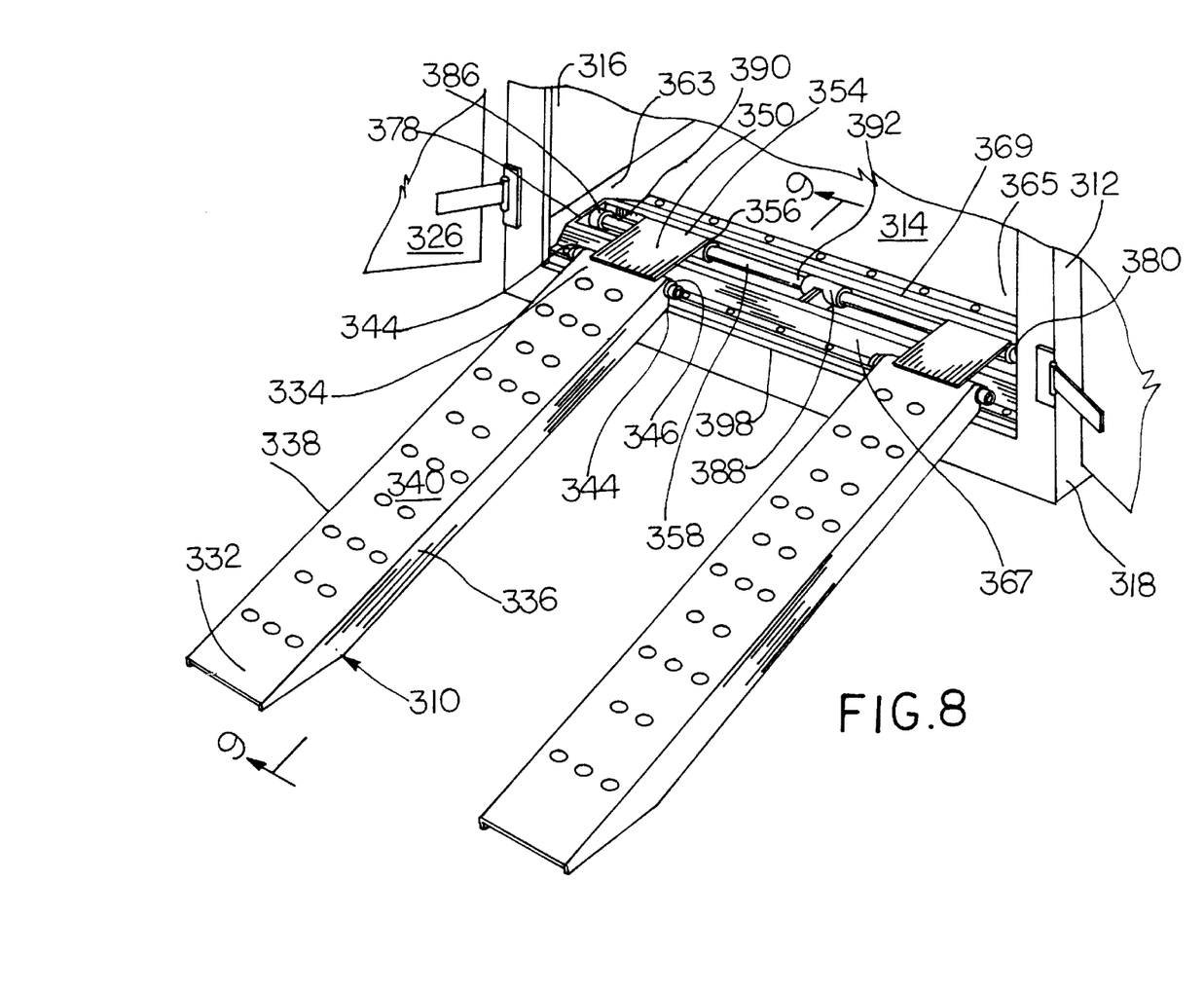
FIG. 8 is a fragmentary view in perspective of a third embodiment of the present invention shown mounted atop the cargo vehicle floor and shown with the loading ramps in the load position.
Figure 9:
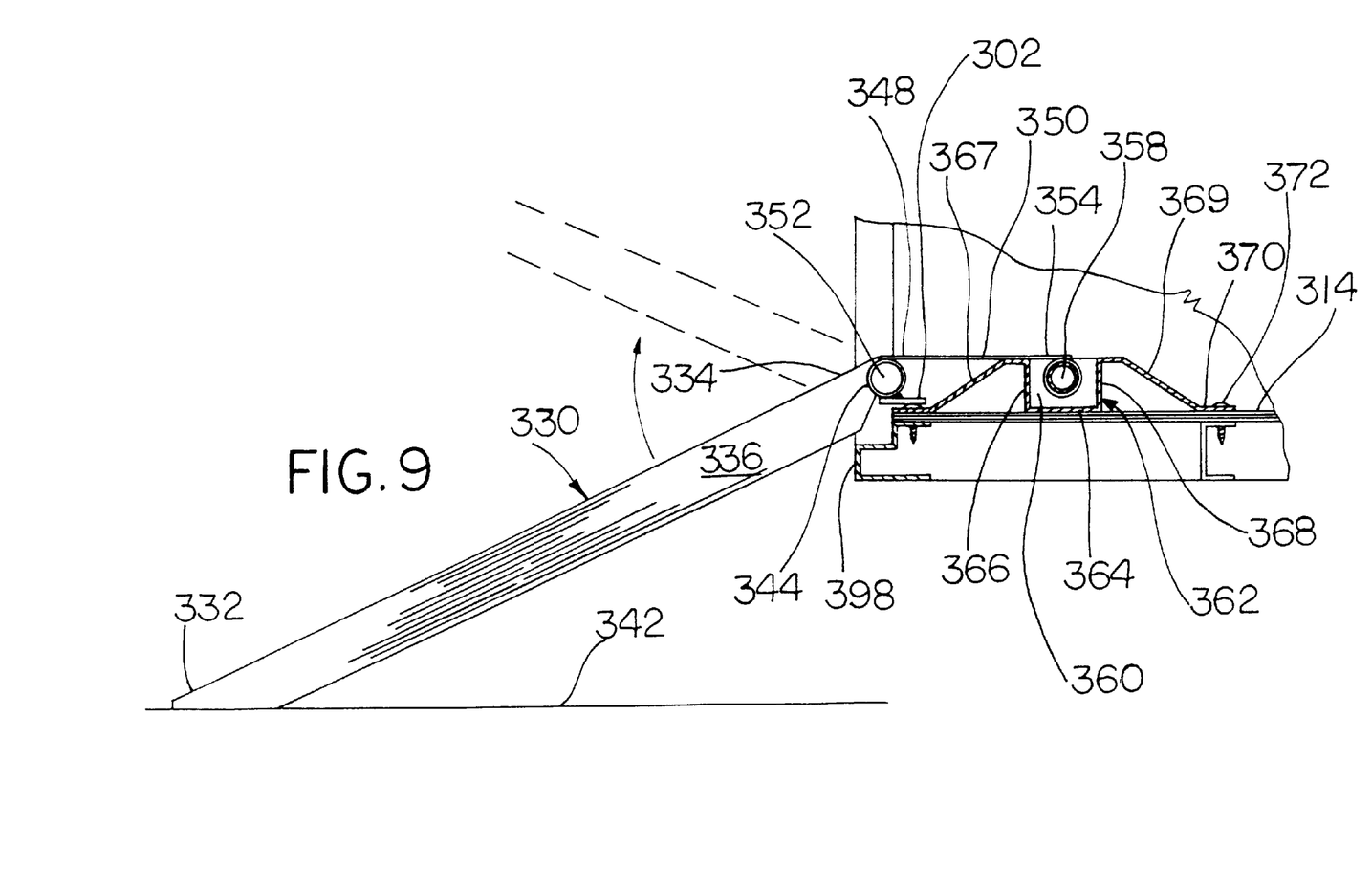
FIG. 9 is a fragmentary view in section taken along lines 7—7 of FIG. 8.

Referring now to the embodiment of FIGS. 8 and 9, a retractable loading ramp device 310 is shown installed on a typical cargo vehicle 312. The vehicle 312 typically includes a floor 314, a pair of side walls 316, 318, a roof (not shown), and one or more doors 326. The embodiment shown illustrates a pair of ramps 330, although the cargo vehicle 312 could include only a single ramp. Only the construction of the ramp shown to the left of FIG. 8 will be described, and it will be understood that the construction of the ramp to the right is the mirror image of that described. Ramp 330 includes a pair of ends 332, 334, and a pair of side edges 336, 338 joined by an interconnecting load bearing surface 340. Edges 336, 338 taper towards end 332, to permit end 332 to rest flush on the ground or support surface 342. End 334 includes a cylindrical sleeve 344, which is pivotally connected to a transverse rod 358. Transverse rod 358 is in turn mounted within a recess 360 defined in channel 362. Channel 362 includes a pair of ends 363, 365, a generally horizontal web or base 364 and a pair of upwardly extending flanges 366, 368, each of which includes a downwardly angled surface 367, 369, respectively. Each surface 367, 369 terminates in a horizontally extending mounting lip 370 having a plurality of mounting holes 372 therein for securing the channel 362 to the floor 314 of cargo vehicle 312. Flanges 366 cooperates with base 364 to define an angled recess 360. Each of ends 363, 365 includes a cylindrical mounting sleeve 386 which receives the outboard end 390 of transverse rod 358. A cylindrical inboard support sleeve 388 is mounted within recess 360 of channel 362 adjacent the middle portion of channel 362 such as by mounting bolts or welding (not shown). End 334 of ramp 330 includes a pair of cylindrical sleeves 344, which align with a corresponding cylindrical sleeve 346 in end 348 of a link member or pivot plate 350. End 334 of ramp 330 is pivotally connected to end 348 of link plate 350 by a tubular shaft 352 inserted through sleeves 344, 346. Tubular shaft 352 is secured within sleeves 344, 346 by a cotter pin or similar means (not shown).

As shown in FIG. 8, end 354 of link plate 350 includes sleeve 356 which is pivotally connected to a transverse rod 358. Transverse rod 358 is in turn mounted within a recess 360 defined in channel 362. Rod 358 is mounted such that its outboard end 390 is mounted in mounting sleeve 386 adjacent end 363, while its inboard end 392 is mounted in inboard support sleeve 388. The rod to the right of FIG. 8 is mounted in a similar manner. Again it will be understood that a single rod 358 could be used to span the distance between ends 363, 365. Each of ends 363, 365 has attached thereto a riser 378, 380, respectively, which are bolted or otherwise secured to their corresponding ends. Each of risers 378, 380 includes a cylindrical mounting sleeve 386 adjacent. Accordingly, ramp 330 pivots about transverse rod 358, and also slides along rod 358, which thus permits ramp 330 to be manipulated between a stored position and a deployed or load position. An angled stop member 302 is mounted to ramp 330 adjacent end 334, and rests on bumper 398 when link plate 350 is in the load position shown in FIG. 9. Accordingly, any load on the end 334 of ramp 330 or the pivot plate 350 is carried by both the bumper 398 and the rod 358. Like the embodiment shown in FIGS. 1 through 5 and 10, the embodiment of FIGS. 8 and 9 is especially well-suited to applications in which the device is retrofitted to an existing trailer, and in applications where the length of the ramp 330 would otherwise be limited by the size of the door opening.

It is understood that the above description does not limit the invention to the above-given details, but may be modified within the scope of the following claims.

What is claimed:

1. An apparatus for attachment to a cargo vehicle, the cargo vehicle including a loading edge over which cargo is loaded onto the vehicle extending between opposed side walls, the apparatus comprising:

a ramp having a pair of ends;

pivot means for pivotally connecting one of said ramp ends to the cargo vehicle adjacent the loading edge thereby permitting said ramp to pivot between a load position in which the other of said ramp ends engages the ground and a stored position; and sliding means carried by said ramp one end for permitting said ramp to slide horizontally between an outboard position adjacent one of the vehicle side walls and an inboard position spaced away from the vehicle side wall, securement means for securing said ramp against movement when said ramp is in said stored position, said securement means including an upwardly extending channel disposed adjacent one of the vehicle side walls, said channel including a pair of flanges and an interconnecting web, said flanges and said web defining a recess for receiving said ramp when said ramp is in said stored position.

2. The apparatus of claim 1, wherein said pivot means includes a rod extending between the vehicle side edges, said ramp one end being pivotally connected to said rod.

3. The apparatus of claim 2, wherein said sliding means includes a cylindrical sleeve connected to said ramp one end, said cylindrical sleeve engaging said rod, thereby permitting said ramp one end to slide along said rod between said outboard position and said inboard position, and further permitting said ramp to pivot about said rod.

4. The apparatus of claim 2, including an adjustable stop member mounted to said rod for limiting the horizontal movement of said ramp along said rod.

5. The apparatus of claim 4, wherein said stop member is an annular collar.

6. The apparatus of claim 1, including a housing having a pair of outboard ends and an inboard portion, said pivot means and said sliding means being operatively connected to said housing.

7. The apparatus of claim 1, including securement means for securing said ramp against movement when said ramp is in said stored position.

8. The apparatus of claim 1, including locking means for locking said ramp in said recess.

9. The apparatus of claim 1, the vehicle including a floor, said channel extending generally vertically upward from said floor.

10. The apparatus of claim 1, including a reinforcing member for reinforcing the loading end of the cargo vehicle, said pivot means and said sliding means being mounted to said reinforcing member.

11. A device for attachment to a cargo vehicle having a floor, the cargo vehicle including a loading edge over which cargo is loaded onto the vehicle extending between opposed side walls, the device comprising;

a ramp having a pair of ends;

a link member having a pair of ends, one of said ramp ends being pivotally connected to one of said link member ends, said ramp being pivotable relative to said link member;

a rod carried by said floor and extending between the cargo vehicle side walls adjacent the loading edge, the other of said link member ends being pivotally mounted to said rod; and sliding means for permitting said link member other end to slide along a horizontal traverse along said rod between an outboard position adjacent one of the vehicle side walls and an inboard position spaced away from the vehicle side wall, said ramp being pivotable between a load position in which said ramp other end engages the ground in a stored position, securement means at a said side wall for securing said ramp against movement when said ramp is in said stored position.

12. The device as claimed in claim 11, wherein said sliding means includes a sleeve attached to said link member other end, said sleeve engaging said rod, whereby said ramp is slidable along said rod between said outboard position adjacent one of the vehicle side walls and an inboard position spaced away from the said vehicle side wall.

13. The device of claim 11, including an adjustable stop member mounted to said rod for limiting the horizontal movement of said ramp along said rod.

14. The device of claim 13, wherein said stop member is an annular collar.

15. The device of claim 11, including a housing having a pair of outboard ends and an inboard portion, said rod being mounted to said housing and extending between said outboard ends.

16. The device of claim 11, including locking means carried by said securement means for locking said ramp in said stored position.

17. The device claimed in claim 11, and a second said ramp; a second said link member; said slide means for permitting said second link member at its said other end to slide alone a horizontal transverse along said rod between an outboard position adjacent the other of the vehicle side walls and an inboard position spaced away from said other vehicle side wall.

18. A device for attachment to a cargo vehicle having a floor, the cargo vehicle including a loading edge over which cargo is loaded onto the vehicle extending between opposed side walls, the device comprising:

a ramp having a pair of ends;

a link member having a pair of ends, one of said ramp ends being pivotally connected to one of said link member ends, said ramp being pivotable relative to said link member;

a rod extending between the cargo vehicle side walls adjacent the loading edge, the other of said link member ends being pivotally mounted to said rod;

sliding means for permitting said link member other end to slide along a horizontal traverse along said rod between an outboard position adjacent one of the vehicle side walls and an inboard position spaced away form the vehicle side wall;

a housing having a pair of outboard ends and an inboard portion, said rod being mounted to said housing and extending between said outboard ends, a channel mounted adjacent one of said housing outboard ends, said channel extending generally perpendicular from the housing and the vehicle floor, said channel including a pair of flanges and an interconnecting web, said flanges and said web defining a recess for receiving said ramp when said ramp is in stored position.

* * * * *